United States Patent
Moskal et al.

(10) Patent No.: US 11,746,235 B2
(45) Date of Patent: Sep. 5, 2023

(54) TWO PART SILICONE MOLDABLE ERASER

(71) Applicant: Crayola LLC, Easton, PA (US)

(72) Inventors: Michael G Moskal, Pottstown, PA (US); Caleigh Anderson, West Pittston, PA (US); Madison Paige Snyder, Center Valley, PA (US); Jake Towne, Easton, PA (US)

(73) Assignee: CRAYOLA LLC, Easton, PA (US)

( * ) Notice: Subject to any disclaimer, the term of this patent is extended or adjusted under 35 U.S.C. 154(b) by 491 days.

(21) Appl. No.: 16/896,347

(22) Filed: Jun. 9, 2020

(65) Prior Publication Data

US 2020/0399472 A1 Dec. 24, 2020

Related U.S. Application Data

(60) Provisional application No. 62/864,550, filed on Jun. 21, 2019.

(51) Int. Cl.
| | |
|---|---|
| *C08L 83/04* | (2006.01) |
| *C08K 3/36* | (2006.01) |
| *C08K 3/26* | (2006.01) |
| *C08K 3/40* | (2006.01) |
| *C08K 3/34* | (2006.01) |
| *C08K 3/013* | (2018.01) |
| *C08K 3/22* | (2006.01) |
| *B01J 31/22* | (2006.01) |
| *B43L 19/00* | (2006.01) |

(52) U.S. Cl.
CPC .......... *C08L 83/04* (2013.01); *B01J 31/2286* (2013.01); *B43L 19/0025* (2013.01); *C08K 3/013* (2018.01); *C08K 3/22* (2013.01); *C08K 3/26* (2013.01); *C08K 3/34* (2013.01); *C08K 3/346* (2013.01); *C08K 3/36* (2013.01); *C08K 3/40* (2013.01); *B01J 2531/828* (2013.01); *C08K 2003/2227* (2013.01); *C08K 2003/2244* (2013.01); *C08K 2003/265* (2013.01); *C08L 2205/025* (2013.01)

(58) Field of Classification Search
CPC ... B34L 19/0025; C08L 83/04; B01J 31/2286; B01J 2531/828; C08K 3/34; C08K 3/013
See application file for complete search history.

(56) References Cited

U.S. PATENT DOCUMENTS

| | | | |
|---|---|---|---|
| 4,367,170 A | 1/1983 | Uhlmann et al. | |
| 5,326,388 A | 7/1994 | Miller et al. | |
| 5,352,282 A | 10/1994 | Miller | |
| 5,460,647 A | 10/1995 | Snedeker et al. | |
| 5,464,470 A | 11/1995 | Brachman et al. | |
| 5,478,382 A | 12/1995 | Miller et al. | |
| 5,486,228 A | 1/1996 | Miller et al. | |
| 5,489,331 A | 2/1996 | Miller et al. | |
| 5,492,568 A | 2/1996 | Miller et al. | |
| 5,498,282 A | 3/1996 | Miller et al. | |
| 2,001,001 A1 * | 8/2001 | Otomo | C09D 5/00 523/161 |
| 8,454,339 B2 | 6/2013 | Ishii et al. | |
| 8,454,881 B2 * | 6/2013 | Ishii | B29C 35/08 264/402 |
| 8,801,976 B2 | 8/2014 | Choi | |
| 9,777,178 B2 | 10/2017 | Clayton et al. | |

FOREIGN PATENT DOCUMENTS

| | | | | |
|---|---|---|---|---|
| EP | 1122289 A1 | 8/2001 | | |
| GB | 2444255 A | 6/2008 | | |
| JP | 10129194 A | 5/1998 | | |
| JP | H10129194 | * | 5/1998 | ............. B43L 19/00 |
| WO | 2013039265 A1 | 3/2013 | | |

OTHER PUBLICATIONS

JPH10129194A English Translation (Year: 1998).*
Great Britain Search Report for Application No. GB2009427.2, dated Feb. 2, 2021, 2 pages.
Sculpey Bake Shop® Eraser Clay, https://www.sculpey.com/amazing-eraser-clay/87-sculpey-amazing-eraser-clay-kit, 5 pages, date unknown.
Klutz: https://www.amazon.com/Klutz-Make-your-own-mini-erasers/dp/1338037501, 10 pages, date unknown.
DIY: How to make silicone eraser (using RTV silicone caulk) https://www.youtube.com/watch?v=JYt3q4Dal1l, one page, date unknown.
DIY: Silicone donut erasers in a few minutes (using clear silicone sealant and cornstarch) https://www.youtube.com/watch?v=2b_JTILR2nU, one page, date unknown.

* cited by examiner

*Primary Examiner* — Ling Siu Choi
*Assistant Examiner* — Huihong Qiao
(74) *Attorney, Agent, or Firm* — RATNERPRESTIA

(57) ABSTRACT

A moldable eraser kit includes a first silicone polymer, a second silicone polymer, an abrasive agent, a catalyst configured to catalyze a reaction between the first silicone polymer and the second silicone polymer at room temperature, and at least two containers such that the first silicone polymer, the second silicone polymer, and the catalyst are not all present in the same container. Also disclosed herein is a method of making an eraser including the steps of mixing a first silicone polymer, a second silicone polymer, a catalyst, an abrasive agent, and optionally one or more additives to form a mixture, the mixture being free of polyvinyl chloride. The method also includes molding the mixture to form a shape and curing the mixture in the shape at room temperature to form a molded eraser.

21 Claims, No Drawings

TWO PART SILICONE MOLDABLE ERASER

CROSS-REFERENCE TO RELATED APPLICATION

This application claims priority to U.S. Provisional Patent Application No. 62/864,550, filed Jun. 21, 2019, the entire disclosure of which is incorporated herein by reference for all purposes.

FIELD OF THE INVENTION

The present invention relates to moldable erasers, compositions for moldable erasers, methods of making moldable erasers, and kits for making molded erasers.

BACKGROUND OF THE INVENTION

There are numerous mold-your-own eraser kits available in the market. However, these commercially available DIY eraser kits generally contain a form of "eraser clay," a pliable clay or putty-like substance, which often includes polyvinyl chloride (PVC). Furthermore, these and other commercial DIY eraser kits require heat to cure the molded eraser, typically by using an oven set to a temperature of greater than 200° F. High temperature curing has its own drawbacks, including a practical limit on the suitable age for use (e.g., limiting the participation of younger consumers). Additionally, there is a risk of thermal degradation of the PVC which may release hazardous hydrochloric acid (HCl). While known moldable eraser kits are in use, the inventors have determined that the state of the art can be improved.

SUMMARY OF THE INVENTION

Embodiments of the invention are defined by the claims below, not this summary. A high-level overview of various aspects of the invention disclosure introduces a selection of concepts that are further described below in the detailed description. This summary is not intended to identify key features or essential features of the claimed subject matter, nor is it intended to be used in isolation to determine the scope of the claimed subject matter.

The present invention provides moldable eraser kits, methods for making a molded eraser and eraser compositions.

In some aspects, a moldable eraser kit is provided, the kit comprising a first silicone polymer; a second silicone polymer; an abrasive agent; a catalyst configured to catalyze a reaction between the first silicone polymer and the second silicone polymer at room temperature; and at least two containers such that the first silicone polymer, the second silicone polymer, and the catalyst are not all present in the same container. In an embodiment of the moldable eraser kit, the at least two containers comprises a first container and a second container, wherein the first container comprises the first silicone polymer and, optionally, the abrasive agent; and the second container comprises the second silicone polymer and, optionally, the abrasive agent. In an embodiment, one or both of the first container and the second container further comprise the catalyst.

In an embodiment of the moldable eraser kit, the at least two containers further comprises a third container comprising the catalyst.

In another embodiment of the moldable eraser kit, a first container of the at least two containers comprises the first silicone polymer, the second silicone polymer and, optionally, the abrasive agent and a second container of the at least two containers comprises the catalyst.

In yet another embodiment, the moldable eraser kit further comprises one or more tools for molding, sculpting, stamping, and patterning.

In some embodiments, the first silicone polymer comprises poly(organosiloxane-co-hydroorganosiloxane) and the second silicone polymer comprises an alkenyl-functional organopolysiloxane.

In some embodiments of the moldable eraser kit, one or more of the at least two containers further comprise one or more additives, the one or more additives comprising at least one of a filler, a colorant including a dye and/or a pigment, glitter, a color developer, a preservative, and a fragrance.

In an embodiment, the catalyst is configured to catalyze a reaction between the first silicone polymer and the second silicone polymer at room temperature within 30 seconds to 60 minutes.

In an aspect of the moldable eraser kit, the kit further comprises at least one of:
  i) a first plurality of containers, each container of the first plurality of containers comprising the first silicone polymer and different from the other in at least one of color, viscosity, visual aesthetics, fragrance, or container size, and
  ii) a second plurality of containers, each container of the second plurality of containers comprising the second silicone polymer, and different from the other in at least one of color, viscosity, visual aesthetics, fragrance, or container size.

In an embodiment of the moldable eraser kits of the present invention, the colorant comprises at least one of a thermochromic colorant, a photoluminescent colorant, a pH-reactive colorant, a photochromic colorant, and a non-reactive colorant resistant to a chemical attack such as from a reducing agent, bleach, or high pH conditions.

In an embodiment, the abrasive agent comprises at least one of pumice, calcium carbonate, clay, carborundum, emery, quartz powder, glass powder, alumina, zirconia, and silica (sand).

In another embodiment, the filler comprises at least one of a starch, flour, clay, mica, silica, alumina, hollow lightweight polymeric microspheres, solid microspheres, metallic powder, calcium carbonate, barium sulfate, titanium dioxide, zinc oxide, and ceramic material.

In some embodiments, the ceramic material comprises at least one of boron nitride, titania, zirconia, alumina, silicon carbide, tungsten carbide, and silicon nitride.

In various embodiments of the moldable eraser kit, the contents of each of the first container and the second container have a viscosity in the range of 0.5 cSt to 10,000,000 cSt.

In one aspect, a method for making a molded eraser is provided. The method comprising the steps of mixing a first silicone polymer, a second silicone polymer, a catalyst, an abrasive agent, and optionally one or more additives to form a mixture, wherein the mixture is free of polyvinyl chloride and wherein the one or more additives comprises at least one of a filler, a colorant including a dye and/or a pigment, glitter, a color developer, a preservative, and a fragrance; molding the mixture to form a shape; and curing the mixture in the shape at room temperature to form a molded eraser.

In an embodiment of the method for making a molded eraser, further comprising, prior to the mixing step, the steps of:
  (i) providing a first container comprising the first silicone polymer and the abrasive, (ii) providing a second container comprising the second silicone polymer and wherein one or both of the first container and the second container comprise the catalyst, and (iii) mixing contents of the first container and the second container, wherein the one or more additives are optionally present in at least one of the first container and the second container and wherein the mixing step comprises mixing the contents of the first container and the second container In an embodiment of the method for making a moldable eraser, the mixing step further comprises mixing one or more additives comprising at least one of a filler, a colorant including a dye and/or a pigment, glitter, a color developer, a preservative, and a fragrance to form the mixture.

In some embodiments of the method for making a moldable eraser, the first silicone polymer comprises poly(organosiloxane-co-hydroorganosiloxane) and the second silicone polymer comprises an alkenyl-functional organopolysiloxane and a platinum catalyst.

An aspect of the present invention provides an eraser composition comprising a silicone copolymer-based resin, an abrasive agent, a catalyst, and optionally unreacted alkenyl groups, wherein the eraser composition is free of polyvinyl chloride and wherein the silicone copolymer-based resin is a platinum (or other precious metal catalyst) mediated crosslinking reaction product of a poly(organosiloxane-co-hydroorganosiloxane) and an alkenyl-functional organopolysiloxane. The eraser composition of the present invention may also comprise residual platinum (or other precious metal catalyst) and one or more additives.

DETAILED DESCRIPTION OF THE INVENTION

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The present invention provides a moldable eraser kit, a method of making a moldable eraser, and an eraser composition. In an aspect, a moldable eraser kit comprises a first silicone polymer, a second silicone polymer, an abrasive agent, a catalyst, and at least two containers such that the first silicone polymer, the second silicone polymer, and the catalyst are not all present in the same container. The catalyst of the moldable eraser kit is configured to catalyze a reaction between the first silicone polymer and the second silicone polymer at room temperature. A moldable eraser made using the moldable eraser kit of the present invention is free of polyvinyl chloride and may, additionally, be free of the associated phthalate plasticizers.

In an embodiment of the moldable eraser kit, the kit comprises a first container comprising the first silicone polymer and, optionally, the abrasive agent; and a second container comprising the second silicone polymer and, optionally, the abrasive agent. The catalyst may be stored in one or both of the first container and the second container. Optionally, the at least two containers may further comprise a third container which may store the catalyst. In an embodiment of the moldable eraser kit, the first container comprises the first silicone polymer and, optionally, the abrasive agent; and the second container comprises the second silicone polymer, the catalyst and, optionally, the abrasive agent. In another embodiment of the moldable eraser kit, the at least two containers comprises a first container and a second container, the first container comprises the first silicone polymer, the second silicone polymer and, optionally, the abrasive agent and the second container comprises the catalyst.

In one embodiment, the moldable eraser kit further comprises one or more tools for molding, sculpting, stamping, and patterning.

First Silicone Polymer

In an embodiment, the first silicone polymer comprises poly(organosiloxane-co-hydroorganosiloxane). In another embodiment, the first silicone polymer has at least one hydrogen atom bonded to silicon. Suitable examples of the first silicone polymer include, but are not limited to, hydride-terminated methylhydrosiloxane-dimethylsiloxane copolymers, trimethylsiloxyterminated methylhydrosiloxane-dimethylsiloxane copolymers, hydride-terminated polydimethylsiloxanes, trimethylsiloxy-terminated polymethylhydrosiloxanes, hydride-terminated polyphenylmethylsiloxane, hydride-terminated polyphenyl(dimethylhydrosiloxy)siloxane, hydride-terminated methylhydrosiloxane-phenylmethylsiloxane copolymer and mixtures thereof.

Second Silicone Polymer

In another embodiment, the second silicone polymer comprises an alkenyl-functional organopolysiloxane. In an embodiment, the alkenyl-functional organopolysiloxane is an alkenyl-terminated organopolysiloxane, where the alkenyl group is at least present on the terminal silicon atom of the organopolysiloxane. In another embodiment, the alkenyl-functional organopolysiloxane is not an alkenyl-terminated organopolysiloxane, but one where the alkenyl group is present along the silicon backbone of the organopolysiloxane. Suitable examples of alkenyl-functional organopolysiloxane include, but are not limited to, vinyl-terminated polydimethylsiloxane, vinyl-terminated diphenylsiloxane-dimethylsiloxane copolymers, vinyl-terminated polyphenylmethylsiloxane, vinyl-terminated diethylsiloxane-dimethylsiloxane copolymers, trimethylsiloxy-terminated vinylmethylsiloxane-dimethylsiloxane copolymers, vinyl-terminated vinylmethylsiloxane-dimethylsiloxane copolymers, vinylmethylsiloxane homopolymers, hydride-terminated vinylmethylsiloxane-dimethylsiloxane copolymers, vinylmethylsiloxane-phenylmethylsiloxane copolymers, vinylmethylsiloxane homopolymers, and mixtures thereof.

Catalyst

As used herein, the term "cure" refers to a catalyst mediated cross-linking reaction between the first silicone polymer and the second silicone polymer. In one embodiment, curing involves a platinum (or other precious metal catalyst) mediated crosslinking reaction between a poly (organosiloxane-co-hydroorganosiloxane) and an alkenyl-functional organopolysiloxane. The moldable eraser kits of the present invention employ components which, when combined, will cure at room temperature (i.e., without additional heating) within 30 seconds to 60 minutes or within 1 to 30 minutes or 5 to 20 minutes. As used herein, the term "cured composition" refers to a composition comprising a silicone copolymer-based resin, an abrasive agent, a catalyst and optionally unreacted alkenyl groups, where the silicon copolymer-based resin is a catalyst mediated crosslinking reaction product. The cured composition of the present invention may also comprise residual catalyst and one or more additives.

Any suitable heterogeneous or homogeneous catalyst can be used, including, but not limited to, platinum, palladium, iridium, and rhodium. In an embodiment, the catalyst is platinum. In another embodiment, the catalyst can be present as a complex with a ligand that can function not only as a diluent, but also as a cure retarder/moderator or an inhibitor to slow down the curing process giving the user time to mix the contents of the first and the second containers, i.e. time to mix a first silicone polymer, a second silicone polymer, an abrasive agent, and a catalyst to form a mixture and before the mixture hardens. The catalyst may be present in at least one of the two containers comprising at least one of the first silicone polymer and the second silicone polymer, in any suitable amount, such as, from about 0.001 wt % to about 6 wt %, or about 0.01 wt % to about 4 wt %, or about 0.1 wt % to about 1.0 wt %, based on the total weight of the cured composition. In an embodiment, the catalyst may be present in a second container comprising the second silicone polymer, and optionally the diluent. In another embodiment, the catalyst may be present in a first container comprising the first silicone polymer. In yet another embodiment, the catalyst may be present in a third container comprising a complex of catalyst with a ligand and an excess ligand that can function as a diluent or moderator.

Moderator (Retarder)

As used herein a moderator (retarder) is any suitable material that retards speed of a reaction by complexing with the platinum, but dissociates at room temperature or higher such that it reversibly binds to the platinum. Exemplary moderators include, but are not limited to, divinyltetramethyldisiloxane, 1,3,5,7-tetravinyl-1,3,5,7-tetramethylcyclotetrasiloxane, dimethyl fumarate, and dimethyl maleate. The moderator may be present, in at least one of the two containers comprising the moderator, catalyst and the second silicone polymer, in any suitable amount, such as, from about 1 wt. % to about 80 wt. %, or about 5 wt. % to about 45 wt. %, or about 10 wt. % to about 20 wt. %, based on the total weight of the cured composition. In an embodiment, the moderator may be present, in a container comprising the moderator and the catalyst, in any suitable amount, such as, from about 0.5 wt. % to about 15 wt. %, or about 1 wt. % to about 10 wt. %, or about 2 wt. % to about 5 wt. %, based on the total weight of the cured composition.

Inhibitor

As used herein, an inhibitor is any suitable material that can shut down a reaction permanently when present but can be volatilized off or decomposed by heat or light, to reactivate. Exemplary inhibitors include, but are not limited to, unsaturated compounds such as methyl-isobutynol or other low boiling acetylenic alcohols and diols, ene-yne compounds such as 3-methyl-3-penten-1-yne, dialkylacetylenedicarboxylates, and mixtures thereof.

In an embodiment, the second container of the moldable eraser kit comprises an alkenyl-functional organopolysiloxane, a platinum-dialkenyltetraorganodisiloxane complex, and an uncomplexed dialkenyltetraorganodisiloxane, as a diluent and/or cure retarder. In another embodiment, the first container of the moldable eraser kit comprises a platinum-dialkenyltetraorganodisiloxane complex, and optionally an uncomplexed dialkenyltetraorganodisiloxane, as a diluent and/or cure retarder. The amount of platinum and the diluent and/or retarder may be adjusted such that the moldable eraser can be cured at room temperature within the range of 30 seconds to 60 minutes or 1-30 minutes or 5-20 minutes.

Additives

In yet another embodiment of the moldable eraser kit, one or more additives may be present in one or both of the at least two containers. In an embodiment, the first container comprises the first silicone polymer and one or more additives. In another embodiment, the second container comprises the second silicone polymer and the catalyst. In another embodiment, the second container consists essentially of the second silicone polymer and the catalysis and is free of additives. The one or more additives may comprise at least one of a filler, a colorant including a dye and/or a pigment, glitter, a color developer, a preservative, and a fragrance. The one or more additives may be present, in at least one of the two containers, in any suitable amount, such as, from about 0.1 wt. % to about 90 wt. %, or about 0.5 wt. % to about 80 wt. %, or about 1 wt. % to about 70 wt. %. It should be noted that the wide variety of additives that may be present in different amounts, leads to very wide range in the total amount of additive that can be present in a composition. For example, fillers will have a high loading (e.g, 20-90 wt. %) while pigments, dyes, and fragrances will have a low loading (e.g., 0.01-5 wt. %).

Filler

Any suitable filler may be used, including, but not limited to, one or more of a starch (e.g., corn starch, arrowroot, or tapioca), flour, clays, cellulose fibers, talc, mica, silica, alumina, hollow lightweight polymeric microspheres (e.g. Dualite®), solid microspheres, metallic powder, calcium carbonate, barium sulfate, titanium dioxide and zinc oxide, and ceramic material. Exemplary ceramic material comprises at least one of boron nitride, titania, zirconia, alumina, silicon carbide, tungsten carbide, and silicon nitride. In a particular embodiment, the filler(s) may be present, in at least one of the two containers, in any suitable amount, such as, from about 5 wt. % to about 90 wt. %, or about 20 wt. % to about 85 wt. %, or about 30 wt. % to about 75 wt. %, based on the total weight of the cured composition. In an embodiment, the fillers may be present, in at least one of the two containers, in any suitable amount, such as, in an amount in the range of 20-75% or 40-75% or 60-75%, based on the total weight of the cured composition. In an embodiment, the filler is present along with the first silicone polymer in the first container.

According to particular embodiments, fillers may be selected from the group consisting of starch (e.g., corn starch, arrowroot starch, potato starch, or tapioca starch), calcium carbonate, cellulose fibers, talc, mica, clays, silicates, and mixtures thereof. In a preferred embodiment, the filler is corn starch. In another preferred embodiment, the filler includes arrowroot starch and/or tapioca starch.

Abrasive Agent

Abrasive agents are used to increase the coefficient of friction between the surface to be erased and the eraser resulting from the inventive moldable eraser kits, thereby physically removing markings (such as pencil markings) from the surface to be erased (e.g., by mechanically wearing away the graphite particles from the surface to be erased). Suitable examples of abrasive agent include, but are not limited to, pumice, calcium carbonate, clay, carborundum, emery, quartz powder, glass powder, alumina, zirconia, and silica (sand). The abrasive agent may be present, in at least one of the two containers, in any suitable amount, such as, from about 5 wt. % to about 70 wt. %, or about 15 wt. % to about 65 wt. %, or about 20 wt. % to about 55 wt. %, based on the total weight of the cured composition. In an embodiment, pumice may be present in an amount from 5-20 wt. %, based on the total weight of the cured composition. In another embodiment, calcium carbonate may be present, in at least one of the two containers, in any suitable amount, such as, in an amount from 10-50 wt. %, based on the total weight of the cured composition.

Preservative

Any suitable preservative may be used optionally. Exemplary optional non-aqueous-based preservatives include Preventol® CMK (p-chloro-m-cresol) from Lanxess, and may optionally be included in one or both containers. In an embodiment, the moldable eraser kit is free of preservative.

Colorant

Any suitable colorant such as dyes or pigments or combinations thereof may be used in the first container and/or the second container. In an embodiment, the colorant may comprise at least one of thermochromic colorant, a photoluminescent colorant, a pH-reactive colorant, a photochromic colorant, and a non-reactive colorant resistant to a chemical attack such as from a reducing agent, bleach, or high pH conditions. The pigment may be advantageously present in an amount from about 0.01 wt. % to about 10 wt. %, or about 0.5 wt. % to about 8 wt. %, or about 1 wt. % to about 4 wt. %, based on the total weight of the cured composition. The dye may be advantageously present in an amount from about 0.01 wt. % to about 10 wt. %, or about 0.5 wt. % to about 8 wt. %, or about 1 wt. % to about 4 wt. %, based on the total weight of the cured composition.

Pigment

Pigments can be present in either the first container or the second container, both the first container and second container, or in a separate container. Any organic or inorganic commercial grade pigment can be used, such as Pigment Green 7, Pigment Orange 13, Pigment Red 101, and Pigment Yellow 14. Additionally, colorants which undergo a color change under various conditions including, but not limited to, thermochromic pigments and dyes, photochromic pigments and dyes, pH reactive pigments and dyes, and non-reactive pigments and dyes resistant to a chemical attack such as from a reducing agent, bleach, or high pH conditions may be used in certain embodiments. As used herein, "color change" means any reaction wherein the color of the colorant is reversibly or irreversibly destroyed or modified.

pH-Reactive Dye: Leuco Dye

In an embodiment, a leuco dye that can be changed from a basic form to an acidic form upon reaction with an acid, as described in U.S. Pat. No. 5,460,647, incorporated herein by reference in its entirety for all purposes can be present in the first container and/or the second container.

Examples of leuco dyes that can be used include, but are not limited to, 6-(dimethylamino)-3,3-bis(4-dimethylamino) phenyl-(3H)-isobenzofuranone (Copikem I Blue, CVL; Hilton Davis Co., Cincinnati, Ohio), 6'-(diethylamino)-3'-methyl-2' (phenylamino)spiro[isobenzofuran-1(3H)-9'-(9H) xanthen]-3-one (Copikem 4 Black, N102; Hilton Davis), 2'-di(phenylmethyl)amino-6'-(diethylamino)spiro[isobenzofuran-1(3H), 9'-(9H)xanthen]-3-one (Copikem 5 Green; Hilton Davis), 3,3-bis(1-butyl-2-methyl-1H-indol-3-yl)-1-(3H)-isobenzofuranone (Copikem 20 Magenta; Hilton Davis), and Copikem 37 Yellow (Hilton Davis).

The leuco dye is a chromophore that acts as a Lewis base, developing color in the presence of a Lewis acid, such as a phenolic resin. The dye(s) is advantageously present in an amount from about 0.05 wt. % to about 5 wt. %, or about 0.5 wt. % to about 4 wt. %, or preferably in an amount from about 1 wt. % to about 3 wt. %, most preferably in an amount of about 2 wt. %.

Dyes That Change Color at pH of about 4 or Less

In an embodiment, the dyes or indicators for use in the present invention, include those whose coloring abilities are easily changed in the presence of a pH of about 4 or less, as described in U.S. Pat. No. 5,489,331, incorporated herein by reference in its entirety.

Especially suitable for use as dyes are those xanthene dyes, phthalocyanine dyes, and azo dyes which are unstable in the presence of a pH of about 4 or less. Dyes which have been found to meet these criteria include Acid Red 92 marketed by International Dyestuffs Corporation, Acid Yellow 1 marketed by International Dyestuffs, PYRANINE 120™, generically referred to as Solvent Green 7 marketed by Miles (Mobay), Solvent Red 48, and mixtures thereof.

Photochromic Dyes

Some leuco dyes used for thermochromism, as disclosed herein, also exhibit photochromism. Other photochromic materials include spiropyrans and in particular, benzospiropyran photochromic dyes. Suitable benzospiropyran photochromic colorants include, but are not limited to 6-nitro-8-methoxy-1',3',3'-trimethylspiro[2H-1-benzopyran-2,-2'-indoline]; 6-nitro-8-methoxy-5'-chloro-1',3',3'-trimethylspiro[2H-1-benzopyran-2,2'-indoline]; 6-nitro-8-methoxy-5-bromo-1',3',3'-trimethylspiro[2H-1-benzopyran-2,2'-indoline]; 6-nitro-8-methoxy-5-bromo-5'-chloro-1',3',3'-trimethylspiro[2H-1-benzopyran-2-2'-indoline]; 6,5'-dinitro-8-methoxy-1',3',3'-trimethylspiro[2H-1-benzopyran-2,2'-indoline]; 6-nitro-8-ethoxy-1',3',3'-trimethylspiro[2H-1-benzopyran-2,2'-indoline].

Other spiropyrans useful in the invention are derivatives of the following classes of compounds: spiro[2H-1-benzopyran-2,2'-[1H]-benzo[g]indoline]; spiro[2H-benzopyran-2,2'[1H]-benzo[e]indoline]; spiro[indoline-2,3'[3H]-naphtho[2,1-b]pyran]; spiro[2H-1-benzopyran-2,2'-benzothiazolines]; spiro[benzothiazoline-2,3'[3H]-naphtho[2,1-b]pyran]; 2,2'-spirobi[2H-1-benzopyran]; 3,3-spirobi[3H-naphtho[2,1-b]pyran]; 2,2'-spirobi[2H-naphtho[1,2-b]pyran]; spiro[2H-1-benzopyran-2,3'[3H]-naphtho[2,1-b]pyran]; spiro[2H-1-benzopyran-2,2'-[2H]-naphtho[1,2-b]pyran]; spiro[4H-1-benzopyran-4,3'[3H]naphtho[2,1-b]pyran]; spiro[2H-naphtho[1,2-b]pyran-2,3'[3H]-naphtho[2,1-b]pyran]; spiro[indoline-2,2'-pyrano[3,2-H]quinoline]; spiro[2H-1-benzopyran-2,2'[2H]quinoline].

Other classes of photochromic dyes include: triarylmethane dyes, cationic polymethane dyes, indenone oxides, nitrones, bis-imidizoles, hexaarylethanes, β-tetrachloroketodihydronaphthalenes, hydrazines, nitroso-dimers, aryl disulfides, stilbenes, indigoids, azo compounds, polyenes, cyanine dyes, unsaturated azines, p-phenyl ketones, nitropyridenes, nitrophenylmethanes, p-nitrobenzyl compounds, dihydroxyanthenones, bianthrones, trans-15,16-dialkyldihydropyrenes, 2H-pyrans, 2H-thiopyrans, and cis-1-aryl-2-nitroalkenes.

Specific photochromic coating formulations are known in the art. See, for example, U.S. Pat. Nos. 4,367,170, 8,801,976, and 9,777,178, all of which are expressly incorporated herein by reference. Photochromic dyes are commercially available from LCR Hallcrest and Chromatic Technologies Inc.

Thermochromic Dyes

Suitable thermochromic dyes include, but are not limited to spirolactones, fluorans, spiropyrans, and fulgides. More specifically; thermochromic dyes are based on diphenylmethane phthalide derivatives, phenylindolylphthalide derivatives, indolylphthalide derivatives, diphenylmethane azaphthalide derivatives, phenylindolylazaphthalide derivatives, fluoran derivatives, styrylquinoline derivatives, and diazarhodamine lactone derivatives. These include: 3,3-bis(p-dimethylaminophenyl)-6-dimethylaminophthalide; 3-(4-diethylaminophenyl)-3-(1-ethyl-2-methylindol-3-yl)phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylaminofluoran; 2-(3-trifluoromethylanilino)-6-diethylaminofluoran; 2-(N-methylanilino)-6-(N-ethyl-N-p-tolylamino)fluoran, 1,3-dimethyl-6-diethylaminofluoran; 2-chloro-3-methyl-6-diethylaminofluoran; 2-anilino-3-methyl-6-diethylaminofluoran; 2-anilino-3-methyl-6-di-n-butylaminofluoran; 2-xylidino-3-methyl-6-diethylaminofluoran; 1,2-benzo-6-diethylaminofluoran; 1,2-benzo-6-(N-ethyl-N-isobutylamino)fluoran, 1,2-benzo-6-(N-ethyl-N-isoamylamino)fluoran; 2-(3-methoxy-4-dodecyloxystyryl)quinoline; spiro[5H-(1)benzopyrano(2,3-d)pyrimidine-5,1'(3'H)isobenzofuran]-3'-one; 2-(diethylamino)-8-(diethylamino)-4-methyl-spiro[5H-(1)benzopyrano(2,3-d)pyrimidine-5,1'(3'H)isobenzofuran]-3'-one; 2-(di-n-butylamino)-8-(di-n-butylamino)-4-methyl-spiro[5H-(1)benzopyrano(2,3-d)pyrimidine-5,1'(3'H)isobenzofuran]-3'-one; 2-(di-n-butylamino)-8-(diethylamino)-4-methyl-spiro[5H-(1)benzopyrano(2,3-d)pyrimidine-5,1'(3'H)isobenzofuran]-3'-one; 2-(di-n-butylamino)-8(N-ethyl-N-isoamylamino)-4-methyl-spiro[5H-(1)benzopyrano(2,3-d)pyrimidine-5,1'(3'H)isobenzofuran]-3'-one; and 2-(di-n-butylamino)-8-(di-n-butylamino)-4-phenyl and trisubstituted pyridines.

Non-Reactive Colorant Resistant to Chemical Attacks Such as from a Reducing Agent, Bleaching Agent or High pH Conditions In an embodiment, the colorant is highly resistant to chemical attack such as from a reducing agent, bleach, or high pH conditions, as described in U.S. Pat. Nos. 5,326,388, 5,352,282, 5,464,470, 5,478,382, 5,486,228, 5,492,558, and 5,498,282, the disclosures of which are incorporated herein by reference in their entireties.

Dyes that may be highly resistant to chemical attack such as from a reducing agent or high pH conditions, include, but are not limited to, xanthene dyes, phthalocyanine dyes, and azo dyes which are stable in the presence of a pH of about 10 or greater and/or are stable in the presence of a reducing agent. Dyes which have been found to meet these criteria include PYRANINE 120™ marketed by Miles (Mobay), Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid red dyes, classified as xanthene dyes, are generally used as colorants for foods, drugs and cosmetics. Specifically, Acid Red 87, is the disodium salt of 2,4,5,7-tetrabromo-9-o-carboxyphenyl-6-hydroxy-3-isoxanthone. Acid Red 87 is also called D &C Red No. 22 by the Food and Drug Administration ("FDA"), and sold under the tradenames Eosine YS and Eosine G. In addition, Acid Red 92, the disodium salt of 9-(3',4',5',6'-tetrachloro-o-carboxyphenyl)-6-hydroxy-2,4,5,7-tetrabromo-3-isoxanthone, is called D & C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9-(o-carboxyphenyl)-6-hydroxy-2,4,5,7-tetraiodo-3H-xanthen-3-one, which contains smaller amounts of lower iodinated fluoresceins.

It should be noted that some additives provide more than one function when added to the first container or to the second container of the moldable eraser kit. For example, titanium dioxide and zinc oxide can be used as pigments but can also function as fillers.

Moldable Eraser Kit

In an aspect of the moldable eraser kit, the kit further comprises at least one of a first plurality of containers and a second plurality of containers. In an embodiment, the moldable eraser kit further comprises a first plurality of containers. In another embodiment, the moldable eraser kit further comprises a second plurality of containers.

In yet another embodiment, the moldable eraser kit further comprises a first plurality of containers, and also a second plurality of containers. Each container of the first plurality of containers comprises the first silicone polymer and is different from the other containers of the first plurality of containers in at least one of color, viscosity, visual aesthetics, fragrance, or container size. Each container of the second plurality of containers comprises the second silicone polymer, and is different from the other containers of the second plurality of containers in at least one of color, viscosity, visual aesthetics, fragrance, or container size.

In an embodiment, the contents of the first container and the second container may have a viscosity in the range of 0.5 cSt to 10,000,000 cSt or 1 cSt to 1,000,000 cSt, or 50 cSt to 100,000 cSt. In an embodiment, the contents of the first container and the second container may have a viscosity in the range of 100 cSt to 50,000 cSt. It should be noted that the viscosity of the contents of the first and the second containers may be adjusted depending upon the nature of the first and the second containers from which they are dispensed. If the container is a squeezable tube type, then the size of the orifice would determine suitable viscosity for use in such tube (i.e., if the viscosity is too high, the consumer may not be able to squeeze the tubes to dispense the material of the first container or the second container). The contents of the first and the second containers may be in the form of, e.g., liquid, paste, putty, and semi-solid.

In an aspect of the moldable eraser kit, the kit also comprises one or more pre-formed molds. The pre-formed molds can have any suitable shape, including but not limited to geometric shapes, foods, vehicles, pets, cartoon characters, and other objects.

The moldable eraser kit may, in some embodiments, include containers having a catalyst and an abrasive agent (and, optionally, one or more additives) premixed with either or both of the first silicone polymer and the second silicone polymer.

Method for Making a Molded Eraser

In an aspect of the invention, there is a method for making a molded eraser comprising the steps of mixing a first silicone polymer, a second silicone polymer, a catalyst, and an abrasive agent to form a mixture, wherein the mixture is free of polyvinyl chloride. The method further comprises molding the mixture to form a shape and curing the mixture in the shape at room temperature to form a molded eraser.

In an embodiment, the mixing step further comprises mixing one or more additives comprising at least one of a filler, a colorant such as a pigment or a dye, a glitter, a color developer, a preservative, and a fragrance.

In another embodiment, prior to the mixing step, the method for making a molded eraser further comprises the steps of:

(i) providing a first container comprising the first silicone polymer and the abrasive, (ii) providing a second container comprising the second silicone polymer and wherein one or both of the first container and the second container comprise the catalyst, and wherein the one or more additives are optionally present in at least one of the first container and the second container and wherein the mixing step comprises mixing the contents of the first container and the second container.

Eraser Compositions

In another aspect of the invention, there is provided an eraser composition comprising a silicone copolymer-based resin, an abrasive agent, a catalyst and optionally unreacted alkenyl groups, wherein the eraser composition is free of polyvinyl chloride. In another aspect of the invention, the eraser composition is free of polyvinyl chloride and may, additionally, be free of the associated phthalate plasticizers.

In an embodiment of the eraser composition, the silicone copolymer-based resin is a platinum catalyzed reaction product of a first silicone polymer, such as a poly(diorganosiloxane-co-hydroorganosiloxane) having at least one hydrogen bonded to silicon with a second silicone polymer, such as an alkenyl-functional organopolysiloxane. In an embodiment, the platinum catalyzed reaction uses platinum-cure silicone chemistry, also known as addition cure or hydrosilylation, in which a methylhydrogen siloxane-dimethylsiloxane copolymer is reacted with a vinyl-terminated polydimethylsiloxane in the presence of a platinum-divinyltetramethyldisiloxane catalyst complex.

EXAMPLES

The invention will be further explained by the following Examples, which are intended to be purely exemplary of the invention, and should not be considered as limiting the invention in any way.

Materials

The silicone components of both Part A and B (methylhydrosiloxane-dimethylsiloxane copolymer, platinum-divinyltetramethyldisiloxane complex dissolved in vinyl-terminated PDMS, and uncomplexed divinyltetramethyldisiloxane) are commercially available from several suppliers including Gelest Inc. (Morrisville, Pa.) and PolyOne (Bethlehem, Pa.). The Pt catalyst may also be obtained from Johnson Matthey (Wayne, Pa.).

Example 1

A Moldable Eraser Kit

Two components, labeled as Part A and Part B, were supplied in known amounts as contained in two separate containers.

As described in Table 1 below, Part A included a methylhydrosiloxane-dimethylsiloxane copolymer as well as pumice as an abrasive agent, corn starch and $CaCO_3$ as one or more fillers.

Part B included the following three reactive components: 1-12 wt. % of a platinum-divinyltetramethyldisiloxane catalyst complex dissolved in a mixture of 50-95 wt. % of vinyl-terminated polydimethylsiloxane and 2-38 wt. % of uncomplexed divinyltetramethyldisiloxane based on the total weight of the catalyst, vinyl-terminated polydimethylsiloxane, and divinyltetramethyldisiloxane mixture. Part B additionally included pumice as an abrasive agent, corn starch, and $CaCO_3$ as one or more fillers, where the amounts in wt. % are based on the total weight of the platinum-divinyltetramethyldisiloxane complex, vinyl-terminated polydimethylsiloxane, uncomplexed divinyltetramethyldisiloxane, and abrasive/filler mixture. An example formulation of the moldable eraser kit is shown below in Table 1:

TABLE 1

| | Part A (g) | Part A (wt. %) | Part B (g) | Part B (wt. %) |
|---|---|---|---|---|
| A complex of Pt(0) and divinyltetramethyldisiloxane | — | — | 3.9 | 0.7 |
| Vinyl-terminated polydimethylsiloxane | — | — | 175.5 | 32.7 |
| Divinyltetramethyldisiloxane | — | — | 15.6 | 2.9 |
| Methyhydrosiloxane-dimethylsiloxane copolymer | 110 | 25.3 | — | — |
| Pumice | — | — | 85 | 15.8 |
| Corn starch | 115 | 26.4 | 12 | 2.2 |
| $Ca(CO)_3$ | 210 | 48.3 | 245 | 45.6 |
| Total | 435.0 | 100 | 537.0 | 100 |

The viscosities of Part A in the first container and Part B in the second container are in the range of 200 cSt to 10,000 cSt.

Example 2

A Moldable Eraser Kit

Another example formulation for a second moldable eraser kit is shown below in Table 2 with a composition similar to that of Example 1 except that the Example 2 has an additional ingredient, a colorant:

TABLE 2

|  | Part A (g) | Part A (wt. %) | Part B (g) | Part B (wt. %) |
| --- | --- | --- | --- | --- |
| A complex of Pt(0) and divinyltetramethyldisiloxane | — | — | 3.9 | 0.7 |
| Vinyl-terminated polydimethylsiloxane | — | — | 175.5 | 32.7 |
| Divinyltetramethyldisiloxane | — | — | 15.6 | 2.9 |
| Methyhydrosiloxane-dimethylsiloxane copolymer | 110 | 24.2 | — | — |
| Pumice | — | — | 85 | 15.8 |
| Corn starch | 115 | 25.3 | 12 | 2.2 |
| Ca(CO)$_3$ | 210 | 46.2 | 245 | 45.6 |
| Colorant | 20 | 4.3 | — | — |
| Total | 455.0 | 100 | 537.0 | 100 |

The viscosities of Part A in the first container and Part B in the second container are in the range of 200 cSt to 10,000 cSt.

Example 3

A Moldable Eraser Kit

Another example formulation for a third moldable eraser kit is shown below in Table 3:

TABLE 3

|  | Part A (g) | Part A (wt. %) | Part B (g) | Part B (wt. %) |
| --- | --- | --- | --- | --- |
| A complex of Pt(0) and divinyltetramethyldisiloxane | — | — | 4.0 | 0.6 |
| Vinyl-terminated polydimethysiloxane | — | — | 180.6 | 27.5 |
| Divinyltetramethyldisiloxane | — | — | 16.1 | 2.45 |
| Methyhydrosiloxane-dimethylsiloxane copolymer | 123 | 27.3 | — | — |
| Pumice | — | — | 85 | 12.9 |
| Corn starch | 115 | 25.6 | 125 | 19 |
| Ca(CO)$_3$ | 210 | 46.7 | 245 | 37.3 |
| Preservatives (optional) | 2 | 0.4 | 2 | 0.3 |
| Total | 450.0 | 100 | 657.7 | 100 |

The viscosities of Part A in the first container and Part B in the second container are in the range of 200 cSt to 10,000 cSt.

Example 4

A Moldable Eraser Kit

A fourth example formulation for a moldable eraser kit is shown below in Table 4:

TABLE 4

|  | Part A (g) | Part A (wt. %) | Part B (g) | Part B (wt. %) |
| --- | --- | --- | --- | --- |
| A complex of Pt(0) and divinyltetramethyldisiloxane | — | — | 4 | 0.8 |
| Vinyl-terminated polydimethylsiloxane | 180.6 | 28.6 | — | — |
| Divinyltetramethyldisiloxane | — | — | 16.1 | 3.4 |

TABLE 4-continued

|  | Part A (g) | Part A (wt. %) | Part B (g) | Part B (wt. %) |
| --- | --- | --- | --- | --- |
| Methyhydrosiloxane-dimethylsiloxane copolymer | 123 | 19.5 | — | — |
| Pumice | — | — | 85 | 17.8 |
| Corn Starch | 115 | 18.2 | 125 | 26.2 |
| Ca(CO)$_3$ | 210 | 33.3 | 245 | 51.4 |
| Preservatives (optional) | 2 | 0.3 | 2 | 0.4 |
| Total | 630.6 | 100.0 | 477.1 | 100.0 |

The viscosities of Part A in the first container and Part B in the second container are in the range of 200 cSt to 10,000 cSt.

Example 5

A Moldable Eraser Kit

A fifth example kit formulation is shown below in Table 5:

TABLE 5

|  | Part A (g) | Part A (wt. %) | Part B (g) | Part B (wt. %) |
| --- | --- | --- | --- | --- |
| A mixture of a complex of Pt(0) and divinyltetramethyldisiloxane, vinyl-terminated polydimethylsiloxane, and uncomplexed divinyltetramethyldisiloxane | — | — | 600 | 100 |
| A mixture of methylhydrosiloxane-dimethylsiloxane copolymer and polydimethylsiloxane | 275 | 45.83 | — | — |
| Pumice | 195 | 32.5 | — | — |
| Ca(CO)$_3$ | 130 | 21.67 | — | — |
| Total | 600 | 100 | 600 | 100 |

The viscosities of Part A in the first container and Part B in the second container are >100,000 cSt, such that they are soft putties.

Example 6

Method of Making a Molded Eraser Using Kits of Examples 1-3

Approximately equal volumes of Part A and Part B of the above Examples 1-3 were measured using an appropriate measuring cup or spoon. Mixing was accomplished with a plastic stirrer and mixing container (optionally, a mechanical mixing device may be used, or simply by manual kneading if the supplied Parts A and B are putty-like instead of viscous fluids). Rapid and thorough mixing was used to evenly disperse the reactants (e.g., the first silicone polymer, the second silicone polymer and the catalyst). Thorough mixing was achieved in less than 30 seconds as evidenced by the appearance of a homogeneous color with no swirls or streaks. An exemplary mixing ratio by volume of Part B to Part A as used for making a stiff cured eraser is 3:1. Decreasing the amount of catalyst relative to Part A resulted in a softer and more flexible eraser. Further reduction in the ratio, for example, reversing the volume ratio (i.e., 1:3 Part B:Part A) resulted in a very soft, spongy compound which lacked the stiffness to satisfactorily erase pencil markings.

Molding was accomplished either by manipulation by hand into a desired shape or by filling pre-formed molds. The molds may be made from any material that is compatible with (e.g., will not be attacked by or react with) the components of Parts A and B. Heat was not used for the curing step, however, application of heat will result in a faster curing time. The molded articles were sufficiently hardened and ready for use as an eraser within approximately 30 minutes after mixing. Molded compounds could be expanded in any direction or even decorated by adding more uncured material to the cured molded object. With respect to the addition of yet more uncured material to the cured molded object, there appeared to be enough unreacted vinyl groups remaining in the cured compound that they reacted with additional vinyl-terminated polydimethylsiloxane and catalyst.

A similar procedure may be used to make a moldable eraser using the moldable eraser kit of Example 4, where part A includes both the first silicone polymer and the second silicone polymer, by mixing Part A and Part B in any suitable volume ratio, such as A:B::1:1. For Example, if a stiffer eraser material is desired, the amount of Part B relative to Part A can be increased, and vice versa, if a softer eraser material is desired, as described above.

Additionally, a similar procedure as used above for Examples 1-3 may be used to make a moldable eraser using the moldable eraser kit of Example 5 by mixing Part A and Part B in a volume ratio of A:B::1:1.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

The invention claimed is:

1. A moldable eraser kit comprising:
    a first silicone polymer;
    a second silicone polymer, wherein the second silicone polymer comprises an alkenyl-functional organopolysiloxane;
    an abrasive agent;
    a catalyst configured to catalyze a reaction between the first silicone polymer and the second silicone polymer at room temperature; and
    at least two containers such that the first silicone polymer, the second silicone polymer, and the catalyst are not all present in the same container,
    wherein a moldable eraser made using the moldable eraser kit is free of polyvinyl chloride.

2. The moldable eraser kit of claim 1 wherein:
    the at least two containers comprises a first container and a second container;
    the first container comprises the first silicone polymer and, optionally, the abrasive agent; and
    the second container comprises the second silicone polymer and, optionally, the abrasive agent.

3. The moldable eraser kit of claim 2, wherein one or both of the first container and the second container further comprise the catalyst.

4. The moldable eraser kit of claim 2, wherein the at least two containers further comprises a third container comprising the catalyst.

5. The moldable eraser kit of claim 2 wherein contents of each of the first container and the second container have a viscosity in the range of 0.5 cSt to 10,000,000 cSt.

6. The moldable eraser kit of claim 1, wherein a first container of the at east two containers comprises the first silicone polymer, the second silicone polymer and, optionally, the abrasive; and wherein a second container of the at least two containers comprises the catalyst.

7. The moldable eraser kit of claim 1 further comprising one or more tools for molding, sculpting, stamping, and patterning.

8. The moldable eraser kit of claim 1, wherein the first silicone polymer comprises poly(organosiloxane-co-hydroorganosiloxane).

9. The moldable eraser kit of claim 1, wherein one or more of the at least two containers further comprise one or more additives, the one or more additives comprising at least one of a filler, a colorant including a dye and/or a pigment, glitter, a color developer, a preservative, and a fragrance.

10. The moldable eraser kit of claim 9, wherein the colorant comprises at least one of a thermochromic colorant, a photoluminescent colorant, a pH-reactive colorant, a photochromic colorant, and a non-reactive colorant resistant to a chemical attack.

11. The moldable eraser kit of claim 10, wherein the non-reactive colorant is resistant to a chemical attack from a reducing agent, bleach, or high pH conditions.

12. The moldable eraser kit of claim 9, wherein the abrasive agent comprises at least one of pumice, calcium carbonate, clay, carborundum, emery, quartz powder, glass powder, alumina, zirconia, and silica (sand).

13. The moldable eraser kit of claim 9, wherein the filler comprises at least one of a starch, flour, clay, mica, silica, alumina, hallow lightweight polymeric microspheres, solid microspheres, metallic powder, calcium carbonate, barium sulfate, titanium dioxide, zinc oxide, and ceramic material.

14. The moldable eraser kit of claim 13, wherein the ceramic material comprises at least one of boron nitride, titanic, zirconia, alumina, silicon carbide, tungsten carbide, and silicon nitride.

15. The moldable eraser kit of claim 1, wherein the catalyst is configured to catalyze a reaction between the first silicone polymer and the second silicone polymer at room temperature within 30 seconds to 60 minutes.

16. The moldable eraser kit of claim 1, further comprising at least one of:
    a first plurality of containers, each container of the first plurality of containers comprising the first silicone polymer and different from the other in at least one of color, viscosity, visual aesthetics, fragrance, or container size, and
    a second plurality of containers, each container of the second plurality of containers comprising the second silicone polymer, and different from the other in at least one of color, viscosity, visual aesthetics, fragrance, or container size.

17. A method for making a molded eraser using the moldable eraser kit, of claim 1, the method comprising the steps of:
    mixing the first silicone polymer, the second silicone polymer, the catalyst, the abrasive agent, and optionally one or more additives to form a mixture, wherein the mixture is free of polyvinyl chloride, and wherein the one or more additives comprises at least one of a filler, a colorant including a dye, and/or a pigment, glitter, a color developer, a preservative, and a fragrance;
    molding the mixture to form a shape; and curing the mixture in the shape at room temperature to form a molded eraser.

18. The method according to claim 17, further comprising, prior to the mixing step, the steps of:
providing a first container comprising the first silicone polymer and the abrasive,
providing a second container comprising the second silicone polymer and wherein one or both of the first container and the second container comprise the catalyst;
wherein the one or more additives are optionally present in at least one of the first container and the second container and
wherein the mixing step comprises nixing the contents of the first container and the second container.

19. The method according to claim 17, wherein the first silicone polymer comprises poly(organosiloxane-co-hydro-organosiloxane).

20. The method according to claim 17 wherein the second silicone polymer comprises an alkenyl-functional organopolysiloxane, and the catalyst comprises a platinum catalyst.

21. An eraser made using the moldable eraser kit of claim 1, the eraser having a composition comprising a silicone copolymer-based resin, the abrasive agent, and the catalyst,
wherein the silicone copolymer-based resin is a catalyst mediated cross-linking reaction product of the first silicone polymer and the second silicone polymer, and
wherein the eraser composition is free of polyvinyl chloride.

* * * * *

UNITED STATES PATENT AND TRADEMARK OFFICE
CERTIFICATE OF CORRECTION

| | |
|---|---|
| PATENT NO. | : 11,746,235 B2 |
| APPLICATION NO. | : 16/896347 |
| DATED | : September 5, 2023 |
| INVENTOR(S) | : Michael G. Moskal et al. |

It is certified that error appears in the above-identified patent and that said Letters Patent is hereby corrected as shown below:

In the Claims

In Claim 13, Line 34, "hallow" should read --hollow--

In Claim 14, Line 39, "titanic" should read --titania--

In Claim 18, Line 14, "nixing" should read --mixing--

Signed and Sealed this
Twenty-eighth Day of May, 2024

Katherine Kelly Vidal
*Director of the United States Patent and Trademark Office*